(12) United States Patent
Huang et al.

(10) Patent No.: US 10,208,870 B1
(45) Date of Patent: Feb. 19, 2019

(54) SOLENOID VALVE

(71) Applicant: HYDROTEK CORPORATION, Nantou (TW)

(72) Inventors: Shu Huang, Nantou (TW); Cheng-Yi Ma, Nantou (TW)

(73) Assignee: Hydrotek Corporation, Nantou Hsien (TW)

(*) Notice: Subject to any disclaimer, the term of this patent is extended or adjusted under 35 U.S.C. 154(b) by 3 days.

(21) Appl. No.: 15/672,504

(22) Filed: Aug. 9, 2017

(51) Int. Cl.
*F16K 31/06* (2006.01)

(52) U.S. Cl.
CPC ...... *F16K 31/0668* (2013.01); *F16K 31/0655* (2013.01)

(58) Field of Classification Search
CPC .......................... F16K 31/0655; F16K 31/0668
USPC .................................................... 251/129.15
See application file for complete search history.

(56) References Cited

U.S. PATENT DOCUMENTS

| | | | | |
|---|---|---|---|---|
| 2,853,659 | A * | 9/1958 | Herion | F16K 31/0675 251/129.15 |
| 3,379,214 | A * | 4/1968 | Weinberg | F16K 31/082 137/625.5 |
| 3,549,119 | A * | 12/1970 | Sellers | F16K 31/0655 251/129.15 |
| 8,100,382 | B2 * | 1/2012 | Robertson, III | F16K 31/06 251/129.15 |
| 8,576,032 | B2 * | 11/2013 | Herbert | F16K 7/16 251/129.15 |
| 8,814,135 | B2 * | 8/2014 | Ams | F16K 31/0686 251/129.15 |
| 2006/0081806 | A1 * | 4/2006 | Doubrawa | F16K 31/0655 251/285 |

* cited by examiner

*Primary Examiner* — Ian Paquette
(74) *Attorney, Agent, or Firm* — Rosenberg, Klein & Lee

(57) ABSTRACT

A solenoid valve includes a coil housing, a coil barrel and an actuator. The coil barrel is mounted in the coil housing, is coiled with multiple coils, and has a valve gate formed on a bottom of the coil barrel. The actuator is moveably mounted in the coil barrel and has a piston, a magnetic shaft, a spring mounted between the piston and the magnetic shaft, and a sealing pad abutting the piston. The actuator is driven by the coils to move the piston. The piston has two notches being able to break a vacuum state, and can be pushed upward easily and efficiently to save electricity.

4 Claims, 7 Drawing Sheets

SOLENOID VALVE

BACKGROUND OF THE INVENTION

1. Field of the Invention

The present invention relates a solenoid valve, more particularly to a solenoid valve that improves the stability of operation, prolongs the service time and has efficient movement to save electricity.

2. Description of Related Art

The conventional automatic water flushers are installed in most public toilets because people increasingly care about the hygiene issue. Therefore, the sink faucet or the urinal tap in the public toilet adopts automatic water flushers to avoid contact with and spread of bacteria or virus.

The conventional automatic water flusher includes a body sensor and a solenoid valve. The body sensor is used for detecting a human body or hand approaching by infrared rays. The solenoid valve includes a valve body and an electromagnet unit connected with the valve body.

The valve body has an inlet port, an outlet tube and a valve gate connected between the inlet port and the outlet tube. The inlet port is connected with a water pipe. The outlet tube is connected with a facility such as a water faucet, urinal tap or any other water flusher.

The electromagnet unit is mounted on the valve body and has a coil barrel, a coil mounted around the coil barrel, a magnetic shaft mounted in the coil barrel, and a piston mounted in the coil barrel and detachably connected with the magnetic shaft. A sealing pad is mounted in one end of the piston.

The solenoid valve is controlled by the body sensor to generate a magnetic field by the coil. The magnetic field passes the magnetic shaft and makes the piston move downward or upward to open or close the valve gate. So, the water from the water pipe can flow into the inlet port and flow out from the outlet tube to the facility.

The piston and a bottom housing extending upwardly will decrease a coiling space around the coil barrel, so the driving force from the coil to the piston will be reduced.

A side wall of the coil barrel is located above the valve gate of the valve body, which occupies a space around the valve gate and badly affects the magnetic route of the piston in movement.

Furthermore, the sealing pad is compressible and has a compression value, which means the compression value of the sealing pad will be bigger under a higher pressure. Consequently, a gap is formed and a magnetic resistance between the piston and the magnetic shaft is increased, and the service life of the sealing pad will be shortened.

In addition, the coil barrel and the valve body are manufactured separately and then assembled to each other. Due to manufacturing errors, an assembling gap is formed between the piston and the magnetic shaft and cannot be controlled at a constant value. It will make the solenoid valve unstable in driving and increases the manufacture time and steps of process.

To overcome the shortcomings of the conventional solenoid valve, the present invention provides a solenoid valve to mitigate or obviate the aforementioned problems.

SUMMARY OF THE INVENTION

The main objective of the present invention is to provide a solenoid valve.

The solenoid valve includes a coil housing, a coil barrel and an actuator. The coil barrel is mounted in the coil housing, is coiled with multiple coils, and has a valve gate formed on a bottom of the coil barrel. The actuator is moveably mounted in the coil barrel and has a piston, a spring, a magnetic shaft and a sealing pad. The spring is mounted between the piston and the magnetic shaft. One end of the piston is mounted around the valve gate.

The actuator can be driven by the coils. The valve gate is manufactured integratedly with the coil barrel. The piston abuts on the valve gate by a sealing pad to increase the strength and to reduce the volume of the valve gate.

Other objects, advantages, and novel features of the invention will become more apparent from the following detailed description when taken in conjunction with the accompanying drawings.

BRIEF DESCRIPTION OF THE DRAWINGS

FIG. 3A is an enlarged perspective view in partial section of the coil barrel of the solenoid valve in FIG. 3;

DETAILED DESCRIPTION OF PREFERRED EMBODIMENT

Figure 1:
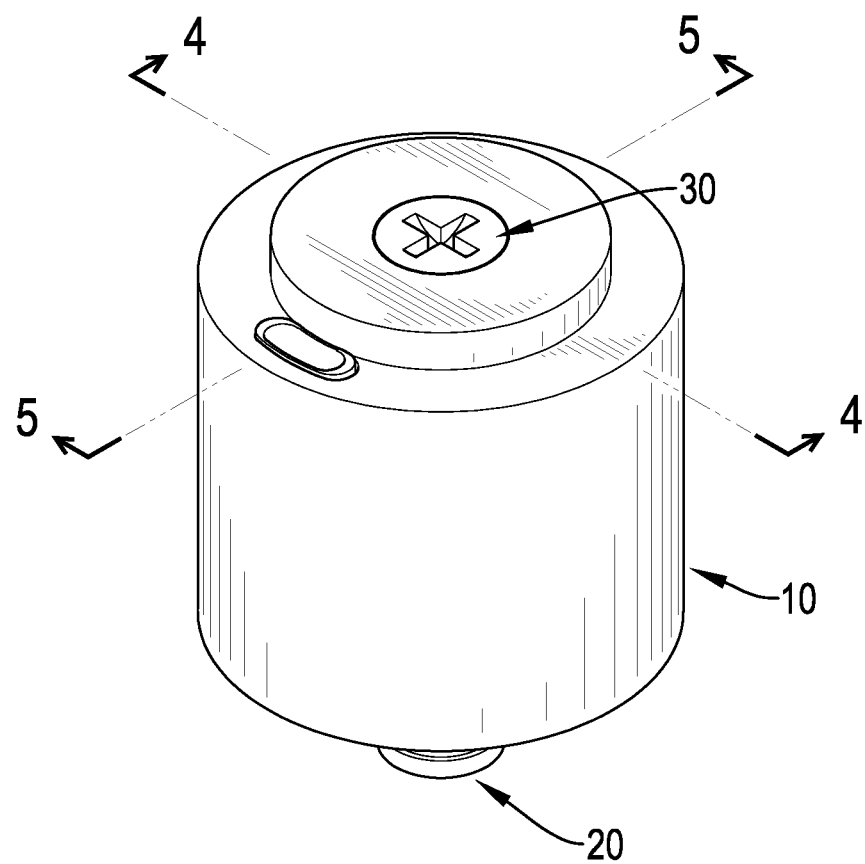
FIG. 1 is a perspective view of a solenoid valve in accordance with the present invention.

With reference to FIG. 1 to FIG. 5, a solenoid valve of a preferred embodiment includes a coil housing 10, a coil barrel 20, an actuator 30 and a bottom cover 40.

The coil housing 10 is hollow, is cylindrical, and has a top surface, a bottom opening 11, an adjusting hole 12, a wire hole 13 and a magnet 14. The bottom opening 11 is formed in the bottom of the coil housing 10. The adjusting hole 12 and the wire hole 13 are formed in the top surface of the coil housing 10. The adjusting hole 12 is located at a center of the top surface of the coil housing 10. The wire hole 12 is located adjacent to a periphery of the top surface of the coil housing 10. The magnet 14 is a round disc, is mounted on the top surface of the coil housing 10, and has a tube hole 141 aligned axially with the adjusting hole 12.

The coil barrel 20 is mounted in the coil housing 10 and includes a shaft tube 21, an upper wall 22, a lower wall 23, a valve body 24, a coiling area 25 and a valve gate 26. The shaft tube 21 has a top end, a bottom end, and an adjusting segment 211 formed on the top end of the shaft tube 21. The adjusting segment 211 has an inner thread and is mounted in the adjusting hole 12 of the coil housing 10 and the tube hole 141 of the magnet 14.

The upper wall 22 and the lower wall 23 are respectively and radially formed around the shaft tube 21. The upper wall 22 is located adjacent to the adjusting segment 211 of the shaft tube 21 and has a wire channel 221 and a wire recess 222. The wire channel 221 is annularly formed around a periphery of the upper wall 22. The wire recess 222 is formed through a top surface of the upper wall 22 and communicates with the wire channel 221, and the shape of the wire recess 222 corresponds to the shape of the wire hole 13. The lower wall 23 is located adjacent to the valve body 24 of the shaft tube 21.

The valve body 24 is formed on the bottom end of the shaft tube 21 and has two inlet grooves 241, an outlet groove 242, two inlet openings 243 and an outlet opening 244. The inlet grooves 241 are formed through the bottom end of the shaft tube 21. The outlet groove 242 is L-shaped, is formed in the shaft tube 21 and is located between the inlet grooves 241. The inlet openings 243 are formed in the bottom end of the shaft tube 21 and respectively communicate with the inlet grooves 241. The outlet opening 244 is formed in a periphery of the shaft tube 21 and communicates with the outlet groove 242.

The coiling area 25 is defined between the upper wall 22 and the lower wall 23. Preferably, multiple coils A are coiled around the coiling area 25 of the coil barrel 20. The valve gate 26 is formed in the valve body 24 and communicates with the inlet grooves 241 and the outlet groove 242.

Figure 3:
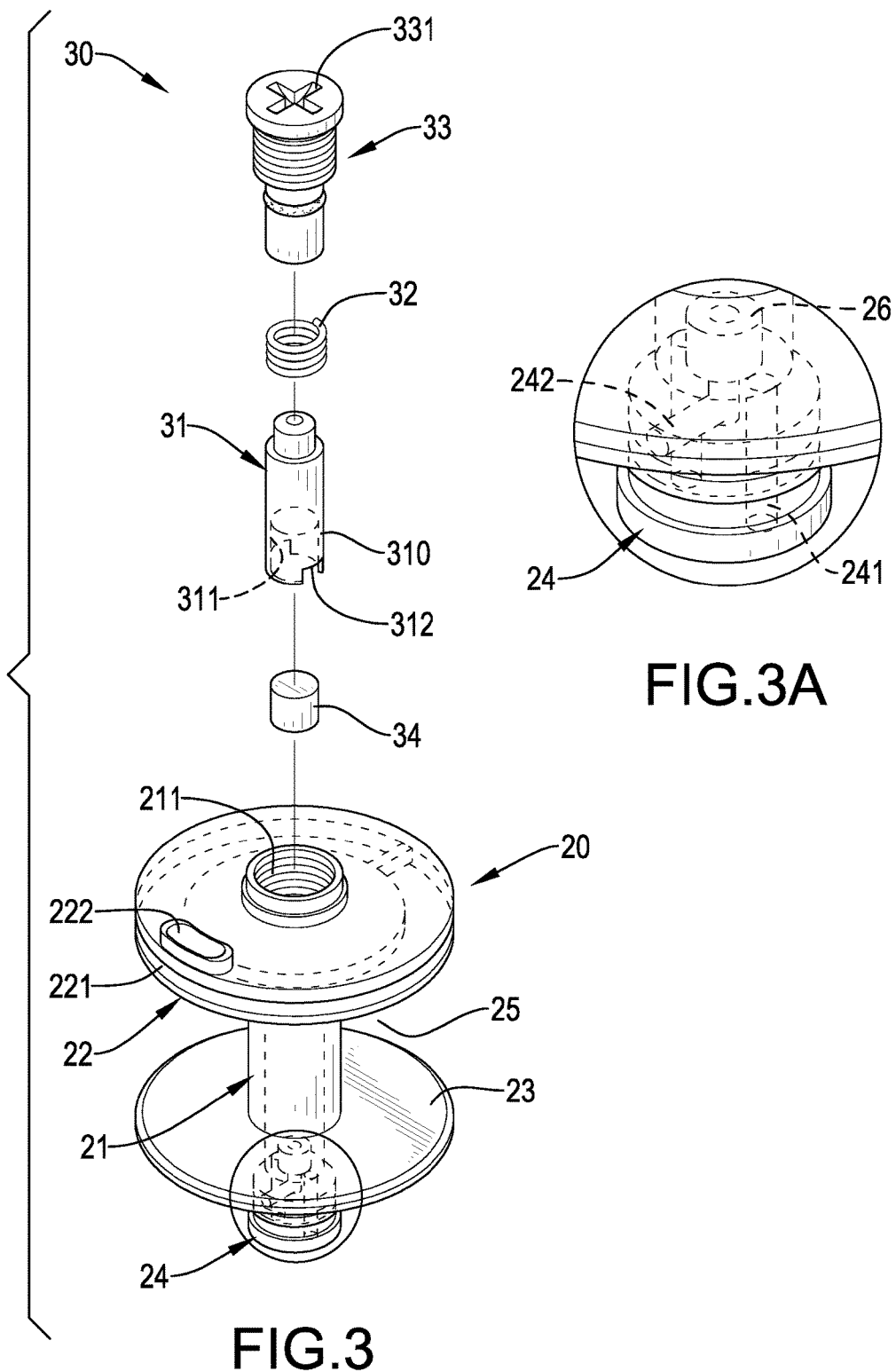
FIG. 3 is an enlarged exploded perspective view of an actuator and a coil barrel of the solenoid valve in FIG. 1.
Figure 4:
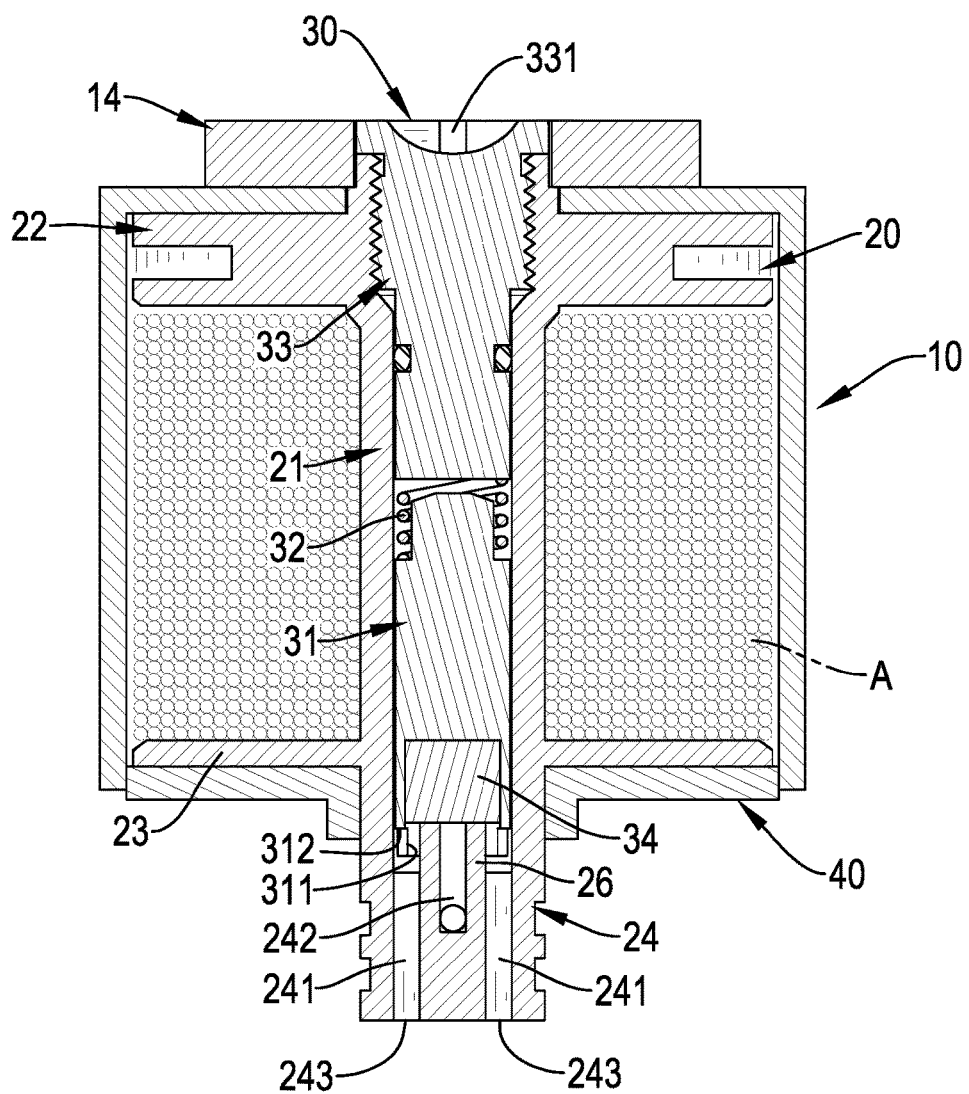
FIG. 4 is a cross-sectional front view of the solenoid valve along the line 4-4 in FIG. 1.
Figure 5:
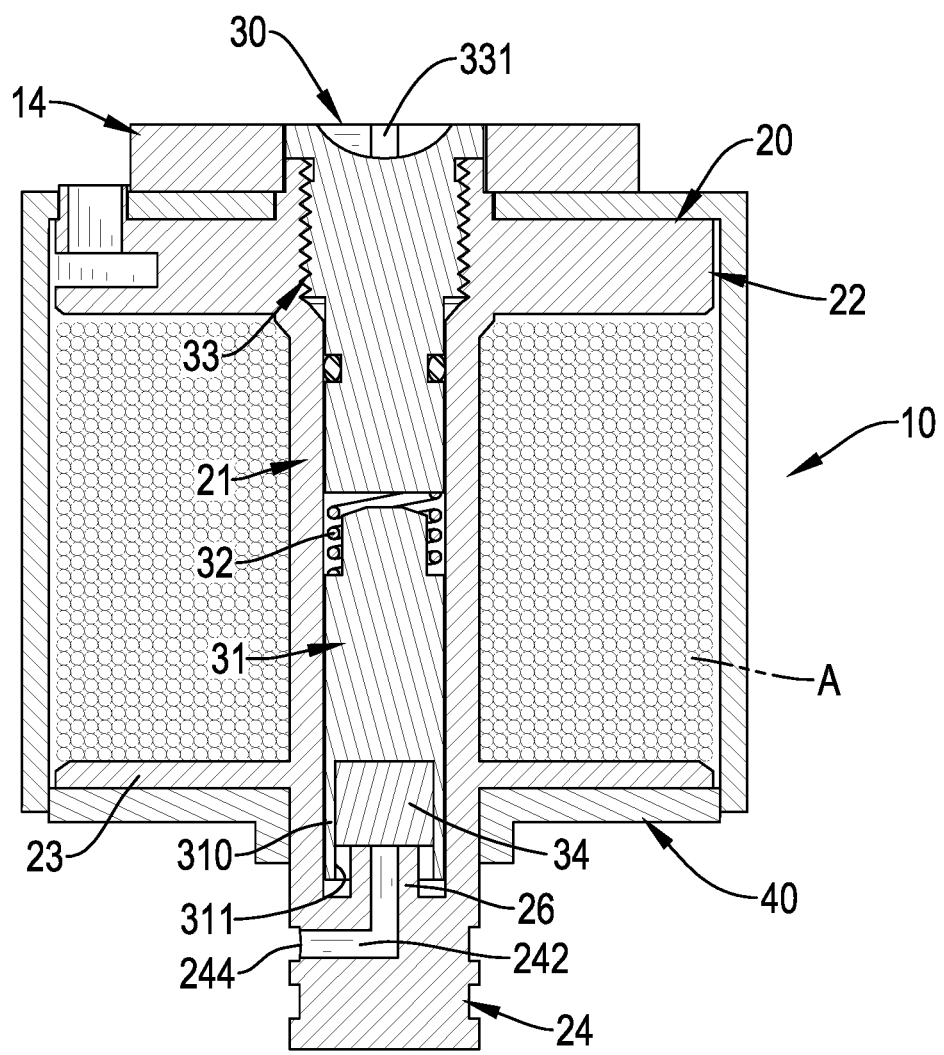
FIG. 5 is a cross-sectional side view of the solenoid valve along the line 5-5 in FIG. 1.

With reference to FIGS. 3 to 5, the actuator 30 is mounted in the shaft tube 21 and includes a piston 31, a spring 32, a magnetic shaft 33 and a sealing pad 34. The piston 31 is movably mounted in the shaft tube 21 and has a side wall 310 downwardly formed around a bottom end of the piston 31, a pad recess 311 formed in the side wall 310, and two notches 312 formed in a bottom edge of the side wall 310 diametrically opposite each other. The spring 32 is mounted around a top end of the piston 31. The magnetic shaft 33 is columnar and is adjustably mounted in the adjusting segment 211 of the coil barrel 20 and abuts the spring 32. The magnetic shaft 33 has a driving recess 331 formed in a top of the magnetic shaft 33 for a screw driver to rotate and to adjust the position of the magnetic shaft 33. The magnetic shaft 33 further has an outer thread correspondingly screwed with the inner thread of the adjusting segment 211. The sealing pad 34 is made of rubber and is mounted in the pad recess 311. The piston 31 abuts the valve gate 26 by the sealing pad 34. The side wall 310 of the piston 31 covers an outer side of the valve gate 26.

Figure 2:
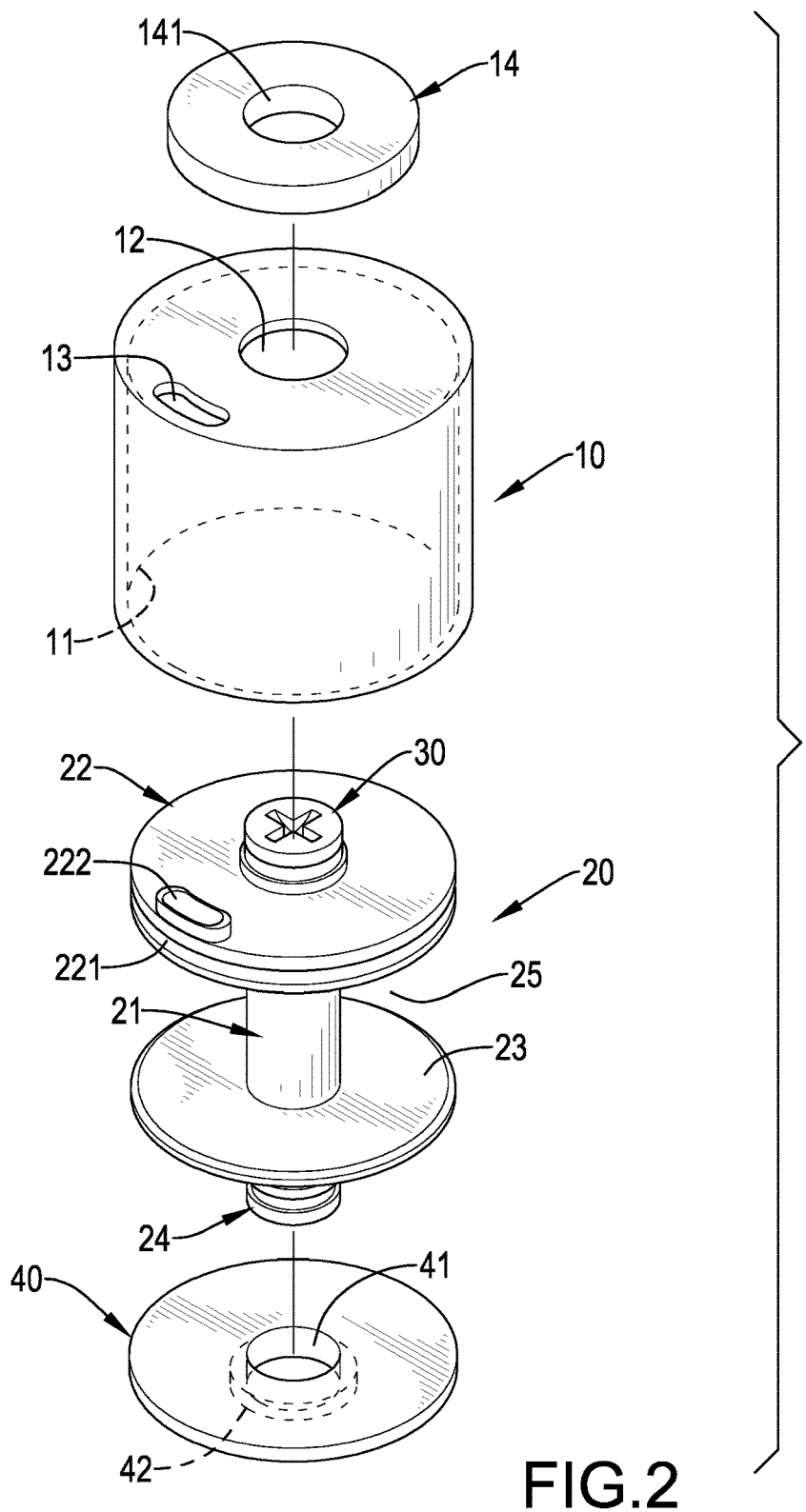
FIG. 2 is an exploded perspective view of the solenoid valve in FIG. 1.

With reference to FIGS. 2, 4 and 5, the bottom cover 40 is a round plate, is mounted on the bottom opening 11 of the coil housing 10, and has a bottom surface, a through hole 41 and a flange 42. The through hole 41 is formed through a center of the bottom surface of the bottom cover 40 and is mounted around the shaft tube 21. The flange 42 is downwardly formed on the bottom surface of the bottom cover 40 and is located around the through hole 41.

Figure 6:
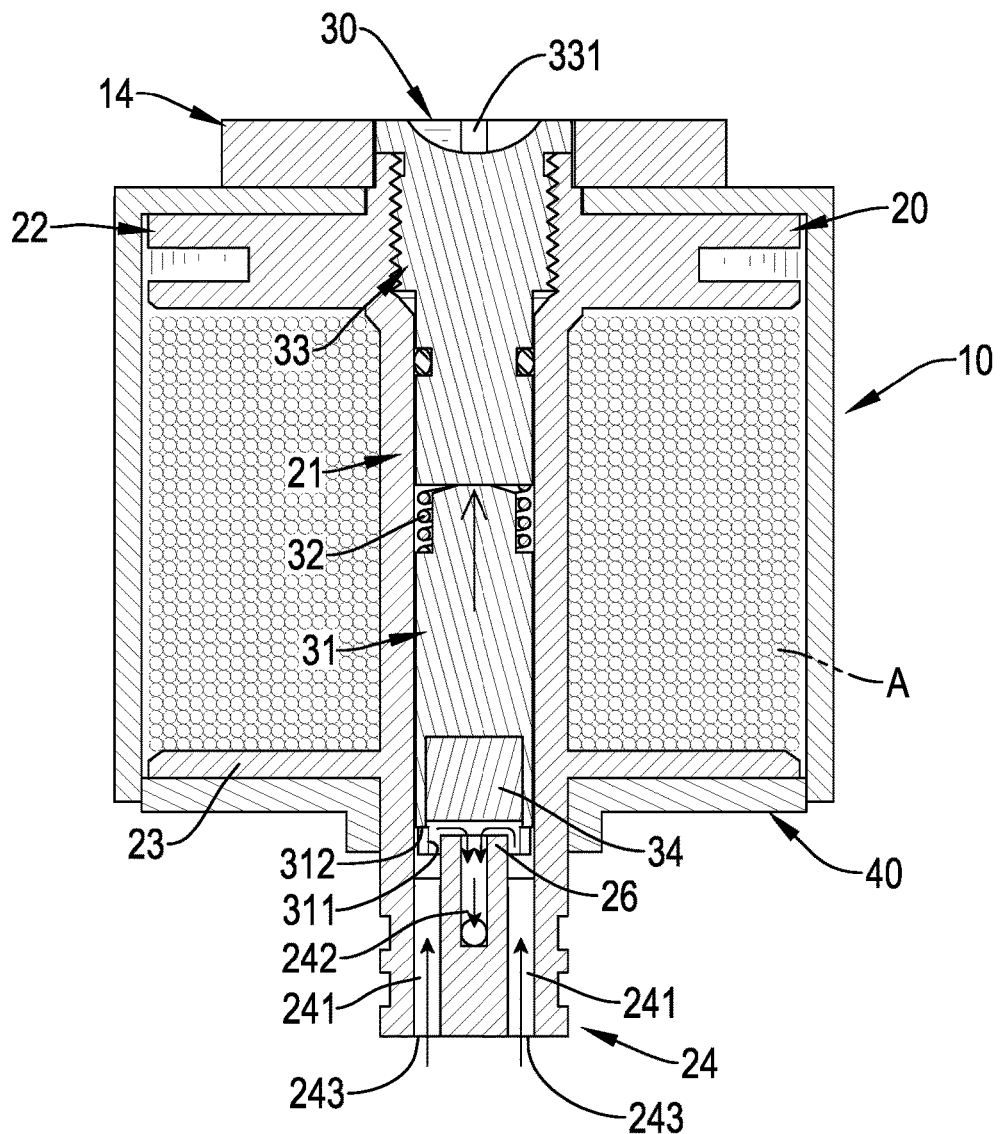
FIG. 6 is an operational cross-sectional front view of the solenoid valve in FIG. 1.
Figure 7:
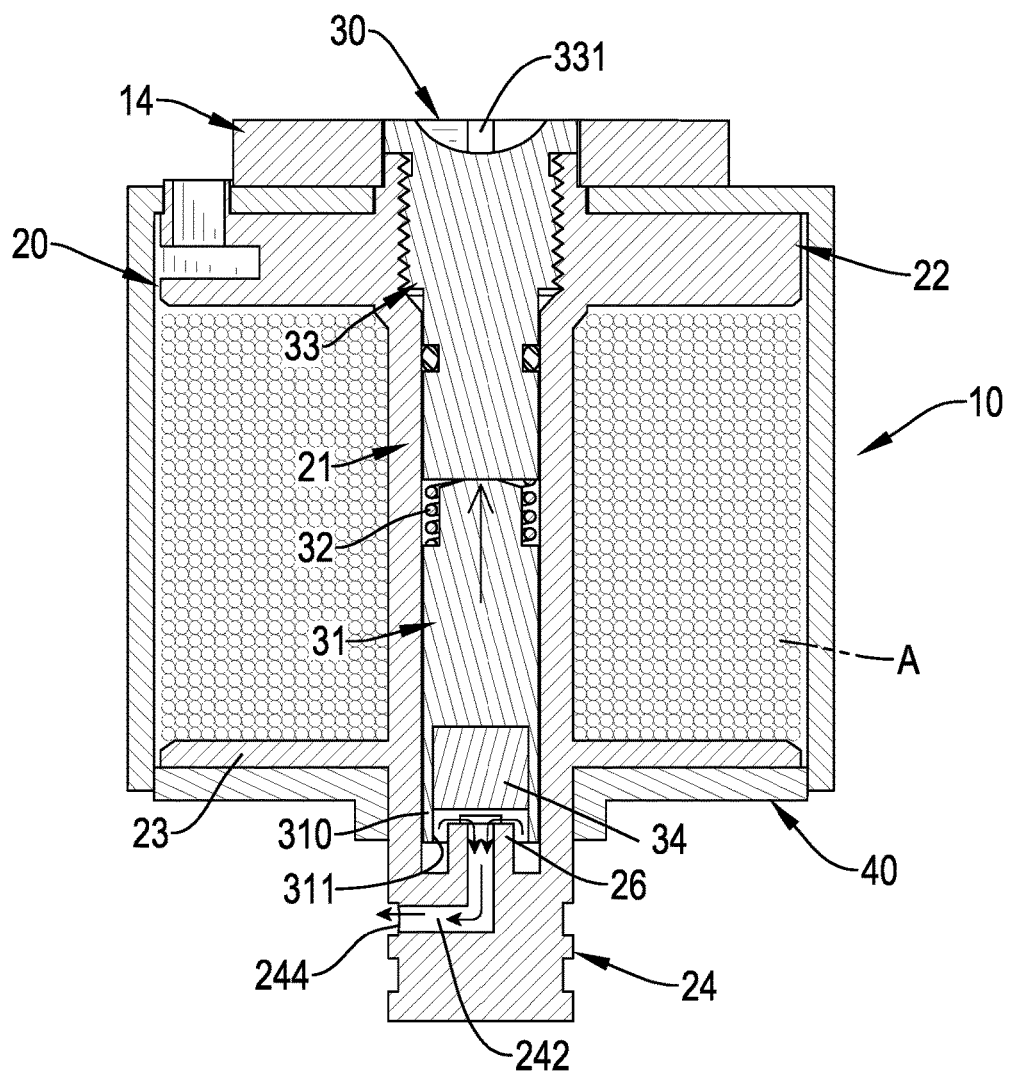
FIG. 7 is an operational cross-sectional side view of the solenoid valve in FIG. 1.

With reference to FIGS. 6 and 7, the coils A are energized to generate an electromagnetic field to active the actuator 30. The piston 31 will be pushed up by the electromagnetic force, and the sealing pad 34 is moved away from the valve gate 26 to make water flow from the inlet grooves 241 to the outlet groove 242.

As described above, the advantages of the present invention are as follows:

1. The flange 42 of the bottom cover 40 is formed downward and will not occupy the coiling area 25 around the coil barrel 20. Therefore, the coiling area 25 can be coiled with more coils to increase the driving force to push the piston 31.

2. The side wall 310 of the piston 31 covering the outer side of the valve gate 26 can save space in the coil barrel 20 and keep the magnetic route of the piston 31 moving.

3. The piston 31 can abut on a surface around the valve gate 26 to limit the compression value of the sealing pad 34, to reduce a gap and a magnetic resistance between the piston 31 and the magnetic shaft 33, and to prolong the service life of the sealing pad 34.

4. The valve body 24 and the valve gate 26 are manufactured integratedly with the coil barrel 20, and the assembling gap between the piston 31 and the magnetic shaft 33 do not need adjusting. It can reduce the manufacturing error, save the production time, and simplify the processing steps.

5. When assembling without water pressure, the assembling gap between the piston 31 and the magnetic shaft 33 can be controlled at a constant value to increase stability of the solenoid valve.

6. The notches 312 of the piston 31 can break a vacuum state when the piston 31 is moved, so the piston 31 can be pushed upward easily and efficiently to save electricity.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A solenoid valve comprising:
   a coil housing being hollow and cylindrical and having a top surface and a bottom opening, wherein the coil housing has
   an adjusting hole formed in the top surface of the coil housing and located at a center of the top surface of the coil housing; and
   a wire hole formed in the top surface of the coil housing and located adjacent to a periphery of the top surface of the coil housing; and
   a magnet having a tube hole;
   a coil barrel mounted in the coil housing and including
     a shaft tube having a top end and a bottom end, and an adjusting segment formed on the top end of the shaft tube and mounted in the adjusting hole of the coil housing;
   the tube hole of the magnet disposed around the adjusting segment of the shaft tube;
     an upper wall and a lower wall respectively and radially formed around the shaft tube;
     a valve body formed on the bottom end of the shaft tube and having at least one inlet groove and at least one outlet groove;
     a coiling area defined between the upper wall and the lower wall; and
     a valve gate formed in the valve body and communicating with the at least one inlet groove and the at least one outlet groove;
   an actuator mounted in the shaft tube and including
     a piston movably mounted in the shaft tube and having
       a side wall downwardly formed around a bottom end of the piston and covering the valve gate,
       a pad recess formed in the side wall and the valve gate covered in the pad recess; and,
       two notches formed in the side wall diametrically opposite each other;
     a magnetic shaft adjustably mounted in the adjusting segment of the shaft tube, wherein the upper wall is located adjacent to the adjusting segment of the shaft tube and has a wire channel and a wire recess, and the wire channel is annularly formed around a periphery of the upper wall; and the lower wall is located adjacent to the valve body;
a spring mounted between the piston and the magnetic shaft;
a sealing pad mounted in the pad recess of the piston; and
a bottom cover mounted on the bottom opening of the coil housing and having
a through hole formed through a center of the bottom cover and disposed around the shaft tube; and
a flange downwardly formed on a bottom surface of the bottom cover and located around the through hole,
wherein the bottom end of the shaft tube is mounted through the through hole of the bottom cover.

2. The solenoid valve as claimed in claim 1, wherein
the at least one inlet groove of the valve body includes two inlet grooves, and the at least one outlet groove of the valve body includes one outlet groove;
the two inlet grooves are formed through the bottom end of the shaft tube and two inlet openings are formed in the bottom end of the shaft tube to communicate with the two inlet grooves; and
the outlet groove is L-shaped, is located between the two inlet grooves, and an outlet opening is formed in a periphery of the shaft tube to communicate with the outlet groove.

3. The solenoid valve as claimed in claim 1, wherein the magnetic shaft is columnar and is connected with the adjusting segment of the coil barrel.

4. The solenoid valve as claimed in claim 3, wherein
the at least one inlet groove of the valve body includes two inlet grooves, and the at least one outlet groove of the valve body includes one outlet groove;
the two inlet grooves are formed through the bottom end of the shaft tube and two inlet openings are formed in the bottom end of the shaft tube to communicate with the two inlet grooves; and
the outlet groove is L-shaped, is located between the two inlet grooves, and an outlet opening is formed in a periphery of the shaft tube to communicate with the outlet groove.

\* \* \* \* \*